United States Patent [19]

Moriyama

[11] Patent Number: 5,583,604
[45] Date of Patent: Dec. 10, 1996

[54] FOCUS DETECTING DEVICE

[75] Inventor: Keiji Moriyama, Kanagawa-ken, Japan

[73] Assignee: Nikon Corporation, Tokyo, Japan

[21] Appl. No.: 392,191

[22] Filed: Feb. 22, 1995

[30] Foreign Application Priority Data

Feb. 23, 1994 [JP] Japan .................................. 6-025505

[51] Int. Cl.⁶ ................................................ G03B 13/36
[52] U.S. Cl. ............................................................. 396/114
[58] Field of Search ................................... 354/402, 406, 354/407, 408; 250/201.2, 201.7, 201.8

[56] References Cited

U.S. PATENT DOCUMENTS

| 4,908,504 | 3/1990 | Karasaki et al. | 250/201.2 |
| 4,992,819 | 2/1991 | Ohtaka et al. | 354/408 |
| 5,229,807 | 7/1993 | Karasaki et al. | 354/407 |
| 5,257,062 | 10/1993 | Moriyama | 354/408 |
| 5,393,969 | 2/1995 | Ohsawa | 250/201.8 |

FOREIGN PATENT DOCUMENTS 63-284513  11/1988  Japan .
1-288810  11/1989  Japan .

Primary Examiner—W. B. Perkey
Attorney, Agent, or Firm—Oliff & Berridge

[57] ABSTRACT

With a focus detection device equipped with focus detecting optical systems with focus detection areas both on and outside the optical axis of the photographic surface, a focus detection device suppresses vignetting of the focus detection light fluxes through incompatibilities with the exit pupil of the installed objective lens and has stable focus detection accuracy. With a focus detection device equipped with at least two focus detecting optical systems and on each focus detecting optical system, which forms the image that comes through the objective lens for each focus detecting optical system as a second image on a set of photoelectric transforming element arrays, and which carries out focus detection of the objective lens through relative position of the second image, reverse projections through the condenser lens of the diaphragm openings opposite the focus detecting optical systems with focus detection areas outside the optical axis of the photographic surface face toward the optical axis of the objective lens and cross the optical axis.

26 Claims, 15 Drawing Sheets

FOCUS DETECTING DEVICE

BACKGROUND OF THE INVENTION

1. Field of the Invention

The present invention relates to a focus detection device used on a camera or the like that employs an appropriate TTL (Through The Lens) phase difference detection method and in particular, to a focus detection device that is ideal for detecting the focus conditions in a plurality of regions within the photo lens image surface.

2. Description of Related Art

The basic construction of a focus detection device that is used on a camera or the like and employs a TTL phase difference detection method is shown in FIG. 14. This focus detection device comprises, positioned in order on the optical axis 0 after the photo lens 1, a field of vision mask 20, a condenser lens 30, a diaphragm mask 40, an image recomposing lens 50 and photoelectric transforming elements 60, forming the focus detection optical system.

The exit pupil 10 of the focus detection optical system is in a position that is conjugate to the diaphragm mask 40 through the condenser lens 30. In the example shown in the drawing, the position of the exit pupil 10 overlaps the position of the photo lens 1. The field of vision mask 20 is positioned in the vicinity of the prearranged image composing surface (surface of film or the like).

Light rays that pass the two divided regions 101 and 102 of the exit pupil 10 form a first subject image in the vicinity of the field of vision mask 20 through the photo lens 1, the light rays being extracted through the field of vision mask 20, and the light rays from the subject image to the condenser lens 30 being restricted. The light rays that pass through the condenser lens 30 pass through openings 401 and 402 of the diaphragm mask, which restrict unnecessary light rays in the same manner and are recomposed as a second image on the element columns 601 and 602 of the photoelectric transforming element column 60 by the correction lens components 501 and 502 of the image recomposing lens 50.

In other words, two second images, which are approximately similar to the first image formed by the photo lens 1, are recomposed behind the first image on the set of photoelectric transforming element columns 601 and 602 by the condenser lens 10, the diaphragm mask 40 and the image recomposing lens 50. The focus adjustment state is detected based on the relative positions of both second images. The relative positions of the two second images on the set of photoelectric transforming columns change according to the focus adjustment state of the photo lens 1. For example, when the focus of both second images meets in front of the field of vision mask surface, the images are farther apart; and when the focus meets behind the field of vision mask surface, the images are closer together. Thus, by comparing the output of both photoelectric transforming element columns 601 and 602, the proper focus adjustment state can be detected.

With a conventional focus detection device based on the basic principles described above, the position of the exit pupil 10 is conjugate to the diaphragm mask 40 through the condenser lens 30 and is set in a fixed position through the characteristic construction of each focus detecting optical system.

In other words, since the two regions 101 and 102 of the exit pupil 10 through which light rays pass become reverse projected images of the openings 401 and 402 of the diaphragm mask 40 through the condenser lens 30, the position is fixed, and both are separate, independent regions.

The focus detection precision originates in the open angle of the centroid, or the so-called centroid open angle, of the two focus detection light rays. As the centroid open angle increases, the detection precision improves.

As indicated by FIGS. 13 (A) and (B) and by the following equation, the power corresponding to the focus adjustment amount of the focus detecting optical system, or the so-called defocus detection range $\Delta Z$, is determined by one side of the centroid open angle $\phi$, the distance L between the exit pupil 10, which is determined by default by the characteristic construction of the focus detecting optical system, and the prearranged focal surface 20 of the photo lens, and the length d of the appropriate side of the prearranged focal surface of the photo lens of the range that detects the relative position of the second image.

$$\Delta Z = (d*L)/(\tan\phi * L - d) \tag{1}$$

FIG. 13 (A) shows the defocus detection range of the infinitely far side at d>0; and FIG. 13 (B) shows the defocus detection range of the near side when d<0.

In order to clarify the focus and improve the precision of focus detection by increasing the centroid open angle and avoiding the decrease of the defocus range on the near-side (d<0), which is comparatively more difficult to secure, or in other words, of the near-side defocus detection range, it is necessary to construct a focus detecting optical system such that the exit pupil 10 is set in a position farther from the prearranged focal surface of the photo lens.

The following problems arise on the focus detection device described above.

Namely, the actual position of the exit pupil of the photo lens that will be installed is not set and varies according to the type of photo lens. There are many cases in which the diaphragm mask 40 through the condenser lens 30 and the conjugate position are different.

When the actual exit pupil position of the photo lens is markedly different, focus detection must be carried out using light rays passing through two regions that are substantially asymmetrical in relation to the optical axis of the actual exit pupil of the photo lens in the focus detecting optical system that has a focus detection region at a position outside the optical axis of the photographic surface (prearranged focal surface) and separated from the optical axis. Therefore the symmetry of the light rays is lost, a portion of the light rays is damaged according to the opening efficiency of the aperture, or in other words, vignetting occurs, and it becomes impossible to detect the focus.

In order to resolve this type of problem, methods are known, such as that clarified in Japanese Laid Open Application No. 63-284513, which reduce the diameter of the perpendicular direction in the arrangement direction of the diaphragm aperture of the set of focus detecting optical systems that have focus detection regions outside the photographic surface optical axis. These methods also decrease the area of the two divided regions of the exit pupil, which lie at conjugate positions.

However, improvement through this method is limited to focus detecting optical systems that have focus detection regions positioned in the direction of the optical axis perimeter at a position separated from the photographic surface optical axis. Improvement cannot be achieved through this method on focus detecting optical systems that have focus detection regions positioned in a radial direction of the photographic surface optical axis.

In addition, if the area of the two divided regions of the exit pupil is decreased too much, the power corresponding to the lowered light intensities pertaining to focus detection can be diminished because the amount of light from the focus detection light rays that reaches the photographic surface is decreased.

In Japanese Laid Open Application No. 1-288810 and the like, methods are provided by which the centroid space and the like of the two divided regions of the exit pupil are forced to be different by a focus detecting optical system with a focus detection region at the center portion of the photographic surface and by a focus detecting optical system that has a focus detection region at the perimeter portion.

However, since the focus detection precision depends on the centroid open angle of the two focus detection light rays in the same way as described above, when the centroid space between the two divided regions of the exit pupil is narrowed, the focus detection precision of the focus detecting optical system that has a focus detection region outside the optical axis of the photographic surface is markedly low when compared with the focus detecting optical system that has a focus detection region on the optical axis of the photographic surface. In addition, this method is restricted to focus detecting optical systems that have focus detection regions positioned in the direction of the perimeter of the optical axis at a position separated from the photographic surface optical axis and does not improve focus detecting optical systems that have focus detection regions positioned in the radial direction of the photographic surface optical axis.

The problems relating to the focus detection region positioned in a radial direction outside the optical axis are further described with reference to the conventional focus detection device shown in FIG. 6. This focus detection device, similar to the device described in FIG. 14, comprises a field of vision mask 22 positioned on the optical axis 0 behind the photo lens, a condenser lens 32, a diaphragm mask 42, an image recomposing lens 52 and a photoelectric transforming element 62. In order to make the drawing more readable, the field of vision mask 22 and the diaphragm mask 42 are shown in a position separated from the optical axis. The focus detecting optical system is formed by the field of vision mask 22, the condenser lens 32, the diaphragm mask 42, the image recomposing lens 52 and the photoelectric transforming element 62. The system has focus detection regions in a total of three places: that is, on the optical axis of the photographic surface and at positions separated from the optical axis the left and right. In each place, there is a focus detection region extending in the vertical direction, with another focus detection region perpendicular to the first and extending in the horizontal direction. Thus, on this device, it can be seen that there are essentially six focus detecting optical systems. In the drawing, Pa, Pb and Pc indicate the actual position of the exit pupil, which changes according to the photo lens.

The exit pupil of each focus detecting optical system is located in the conjugate position of the diaphragm mask 42 through the condenser lens 32. With the conventional device of FIG. 6, the "conjugate position" of each focus detecting optical system is in the same position on the optical axis 0. In this case, as shown in FIG. 7, the focus detecting optical lines that are farthest to the outside correspond to q2 and r2 and are outside the actual exit pupils Pa, Pb, and Pc. In other words, vignetting occurs. FIG. 7 also shows the optical lines that relate to the present invention for the purpose of comparison, but these will be described hereafter.

The light rays that correspond to the focus detection regions outside the optical axis are shown in the vignetting condition by the exit pupils Pa, Pb, and Pc in FIGS. 8 (A), (B), and (C). As can be seen from the drawings, vignetting only occurs for one of the optical lines of the set for the focus detection region positioned in the radial direction outside the optical axis in each case. As a result, proper focus detection cannot be carried out in relation to the focus detection regions in the radial direction outside the optical axis.

SUMMARY OF THE INVENTION

The present invention has been conceived in light of these types of conventional inconveniences and has an object of providing a focus detection device that suppresses the vignetting of the focus detection light rays that results from improper alignment with the exit pupil of the installed photo lens and that has a stabilized focus detection precision.

In order to accomplish the above-mentioned objective, the focus detector is equipped with at least two focus detecting optical systems that comprise a condenser lens positioned in the vicinity of the prearranged focal surface of the photo lens; a diaphragm mask positioned behind the condenser and having an opening that divides the pupil of the lens into two regions; and an image recomposing lens that corresponds to the opening of the photo lens, forms the image that comes through the photo lens by each focus detecting optical system as a second image on a set of photoelectric transforming element columns, and carries out focus detection of the photo lens through the relative position of the second image. The focus detection regions comprise a first detection region positioned on the optical axis on the prearranged focal surface and a second detection region positioned outside the optical axis. The reverse projection of the diaphragm mask that has passed the condenser lens in the focus detecting optical system that corresponds to the second focus detection region crosses the optical axis of the photo lens and forms an image of the opening of the diaphragm at a position separated from the optical axis on the side opposite the focus detection region.

With this focus detection device, the optical axis of the condenser lens that relates to the focus detecting optical system corresponding to the above-mentioned second focus detection region is eccentric. Alternatively, the optical axis of the condenser lens that relates to the focus detecting optical system corresponding to the above-mentioned second focus detection region is inclined.

The above-mentioned second focus detection region may also be positioned along a radial direction of the optical axis outside the optical axis of the photo lens.

A third focus detecting optical system with a third focus detection region may be provided outside the optical axis of a prearranged focal surface of the photo lens along the perimeter of the optical axis of the photo lens so as to be approximately perpendicular to the second focus detection region.

The focus detecting optical system that has a focus detection region outside the optical axis of the prearranged focal surface may be configured such that the distance from the condenser lens to the photoelectric transforming element column is different from the corresponding distance on a focus detecting optical system that has a focus detection region on the optical axis of the prearranged focal surface. In this case, the focus detecting optical system that has a focus detection region outside the optical axis should be configured such that the size of the diaphragm opening is different from that of the focus detecting optical system with a focus detection region on the optical axis, and such that the size of the reverse projected image is the same as that of the diaphragm opening.

The conjugate point of the diaphragm via the condenser lens of the focus detecting optical system with a focus detection region outside the optical axis and the conjugate point of the diaphragm via the condenser lens of the focus detecting optical system with a focus detection region on the optical axis may exist at approximately the same point or at different points in relation to the direction along the optical axis.

The above-mentioned focus detecting optical systems may also be constructed so as to be equipped with a first focus detecting optical system that has a focus detection region on the optical axis and second and third focus detecting optical systems that each have focus detection regions outside the optical axis, with the first focus detecting optical axis in between. The distance from the condenser lens to the photoelectric transforming element column on the second and third focus detecting optical systems is formed shorter than the corresponding distance on the first focus detecting optical system.

A field of vision mask may be provided that has an opening restricting each focus detection region, the field of vision mask being positioned in the vicinity of the prearranged image composing surface of the photo lens at the front of the condenser lens.

At least six of the focus detecting optical systems may be provided that correspond to six focus detection regions. As the six focus detection regions, there are a first set of focus detection regions positioned in a cross shape on the optical axis, a second set of focus detection regions positioned in a cross shape outside the optical axis, and a third set of focus detection regions positioned in a cross shape opposite the second set of focus detection regions also outside the optical axis.

With the present invention, a focus detecting optical system on which the projection is separated from the prearranged focal surface is positioned so that the focus detection region is outside the optical axis of the photographic surface and is constructed so that the reverse projection image from the condenser lens of the opposing diaphragm opening faces the optical axis of the photo lens and crosses the optical axis.

In other words, the reverse projection image from the condenser lens at the center of the outer circumference of the diaphragm opening opposing the focus detecting optical system with a focus detection region outside the optical axis of the photographic surface is configured such that the reverse projection image crosses the optical axis in the vicinity of the position on the optical axis of the photo lens upon which the exit pupil positions of the photo lens, which is actually installed, are widely distributed. Since the opposite focus detection light ray that corresponds to the outermost focus detection region outside the optical axis of the photographic surface is also approximately symmetrical to the optical axis in the vicinity of the position on the optical axis of the photo lens upon which the exit pupil postions of the photo lens, which is actually installed, are widely distributed, vignetting is avoided.

In particular, with the present invention, vignetting can be avoided even on a focus detecting optical system with a focus detection region positioned in a radial direction outside the photographic surface optical axis. Thus, horizontal, vertical or cross-shaped (combined horizontal and vertical, crossing each other) focus detection regions can be used as the focus detection regions positioned outside the optical axis of the photographic surface.

In addition, by making the construction such that the total length of the focus detecting optical system outside the optical axis of the photographic surface is different from the total length of the focus detecting optical system on the optical axis, the extra space inside the camera body can be adapted, and the focus detection device need not require enlarging the entire camera.

With the focus detection device described above on which the usage magnification of the condenser lens that forms a conjugate relationship with the exit pupil and the diaphragm mask differs for each focus detecting optical system, by making the construction such that the size of the diaphragm opening is different for each focus detecting optical system, which has a different total length, and so that the sizes of the reverse projection images of the diaphragm opening at an arbitrary position of the photo lens on the optical axis are approximately equal, the light amount of the focus detection light rays that reach the photographic surface for each focus detecting optical system becomes approximately uniform, and the power that pertains to focus detection at a low degree of brightness for each focus detecting optical system can be maintained with approximate equality.

In addition, by making the construction such that the distance L between the exit pupil of the focus detecting optical system outside the optical axis and the prearranged focal surface of the photo lens is longer than the distance between the corresponding distance on the focus detecting optical system on the optical axis, a close-distance defocus detection range can be maintained.

Furthermore, since photography with asymmetrical aberrations or the like of the optical axis of the photo lens is insignificant with the focus detecting optical system with a focus detection region on the optical axis of the photographic surface, and because the reliability of focus detection is higher than on a focus detecting optical system outside the optical axis, the distance between the exit pupil of the focus detecting optical system on the optical axis and the prearranged focal surface of the photo lens can be made longer, making possible a wider-range close-distance defocus detection.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

The first embodiment of the present invention will be described with reference to FIGS. 1–5.

Figure 1:
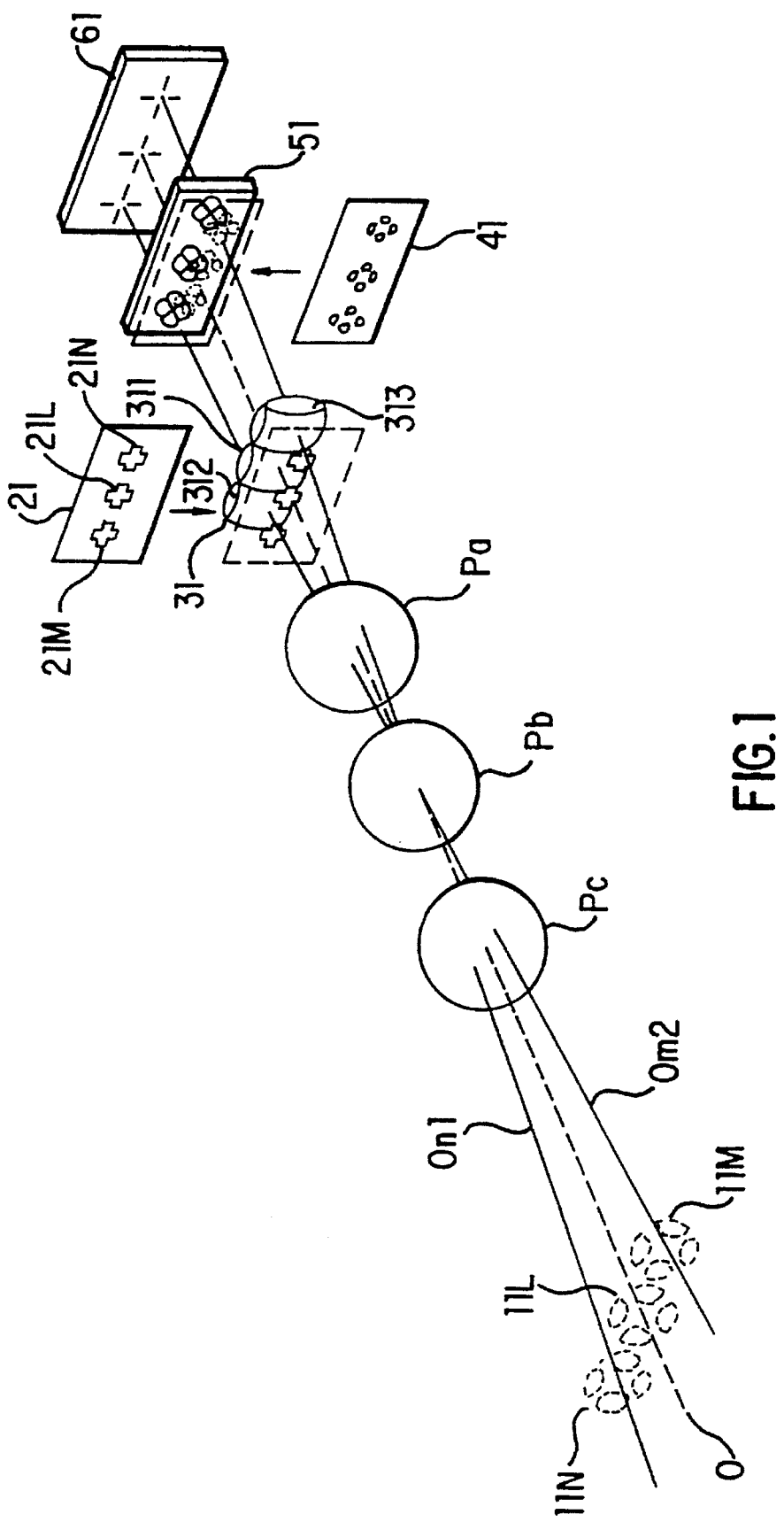
FIG. 1 is an explanatory drawing showing the construction of a first embodiment.
Figure 6:
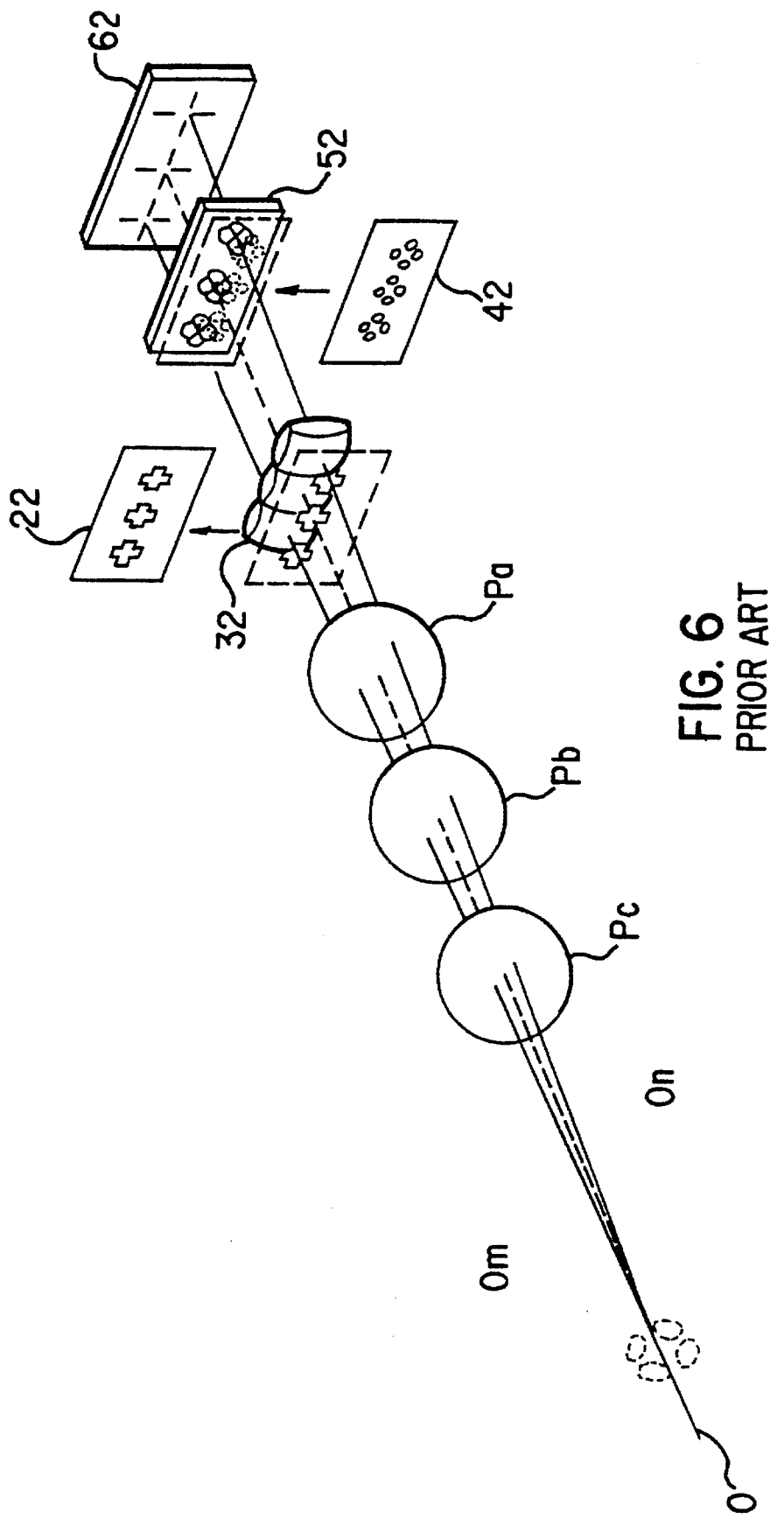
FIG. 6 is an explanatory drawing showing the construction of a conventional focus detection device.

FIG. 1 shows the construction of a focus detection device of a first embodiment. As with the focus detection device shown in FIG. 6, this focus detection device has focus detection regions on the optical axis of the photographic surface and outside the optical axis in two places. At each location, a horizontal region intersects a vertical region. In other words, each focus detecting optical system has two portions of the focus detection region, one vertical and one horizontal, which are joined together. These joined regions are components that contribute to a single focus detecting optical system comprising the field of vision mask 21, the diaphragm mask 41, the image recomposing lens 51, and the photoelectric transforming elements 61. In this sense, the device of FIG. 1 can be viewed as having a total of six focus detecting optical systems.

Figure 15:
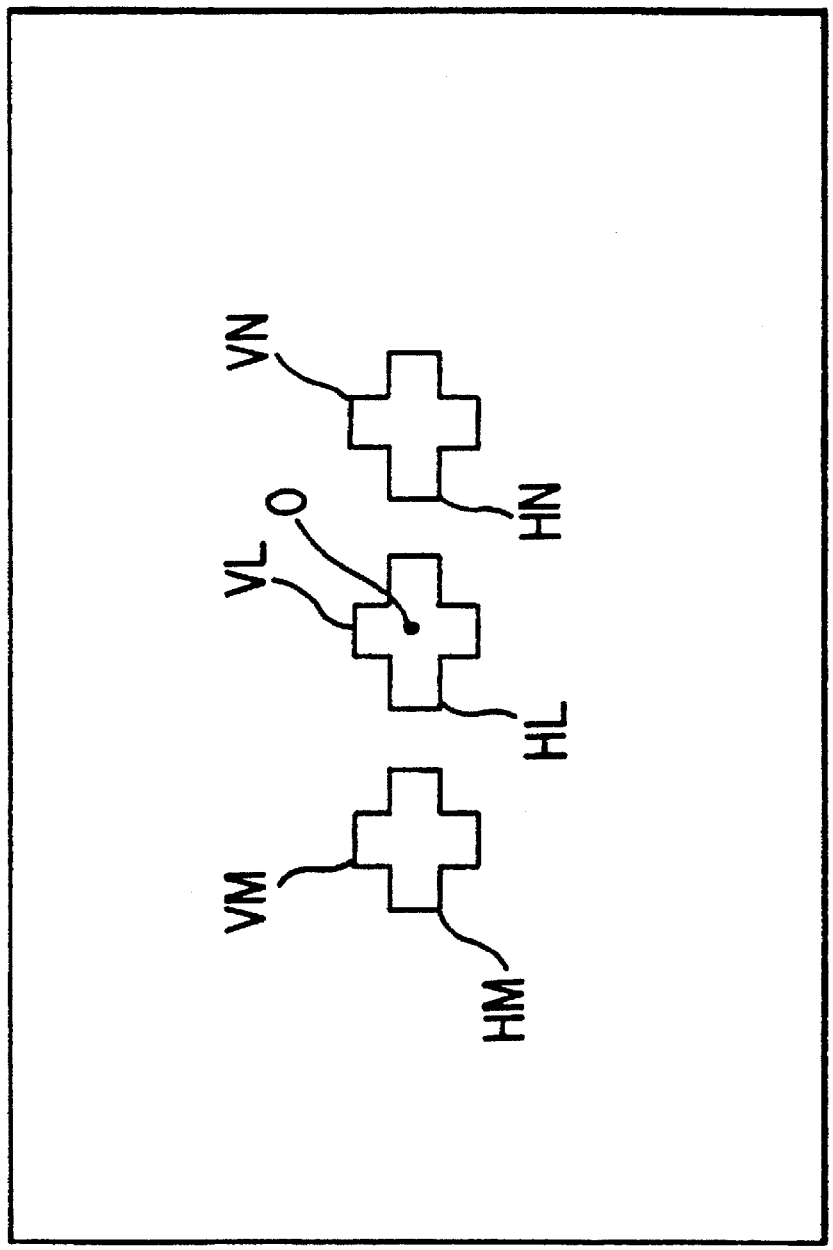
FIG. 15 is an explanatory drawing showing the focus detection regions as viewed from the finder.

FIG. 15 shows the relationship of the focus detection regions to the photographic surface as viewed through the camera viewfinder (not shown). In this example, a focus detection region VL extending in the vertical direction and a focus detection region HL extending in the horizontal direction intersect on the optical axis 0. A focus detection region VM extending in the vertical direction and a focus detection region HM extending in the horizontal direction intersect in a cross shape at the left side of the surface, separated from the optical axis 0. A focus detection region VN extending in the vertical direction and a focus detection region HN extending in the horizontal direction intersect in a cross shape at the right side of the surface, separated from the optical axis 0.

Returning to FIG. 1, the six focus detecting optical systems each comprise a field of vision mask 21, a condenser lens 31, a diaphragm mask 41, an image recomposing lens 51, and a photoelectric transforming element column 61. Each of these components have portions that correspond to the individual focus detecting optical systems.

Figure 2:
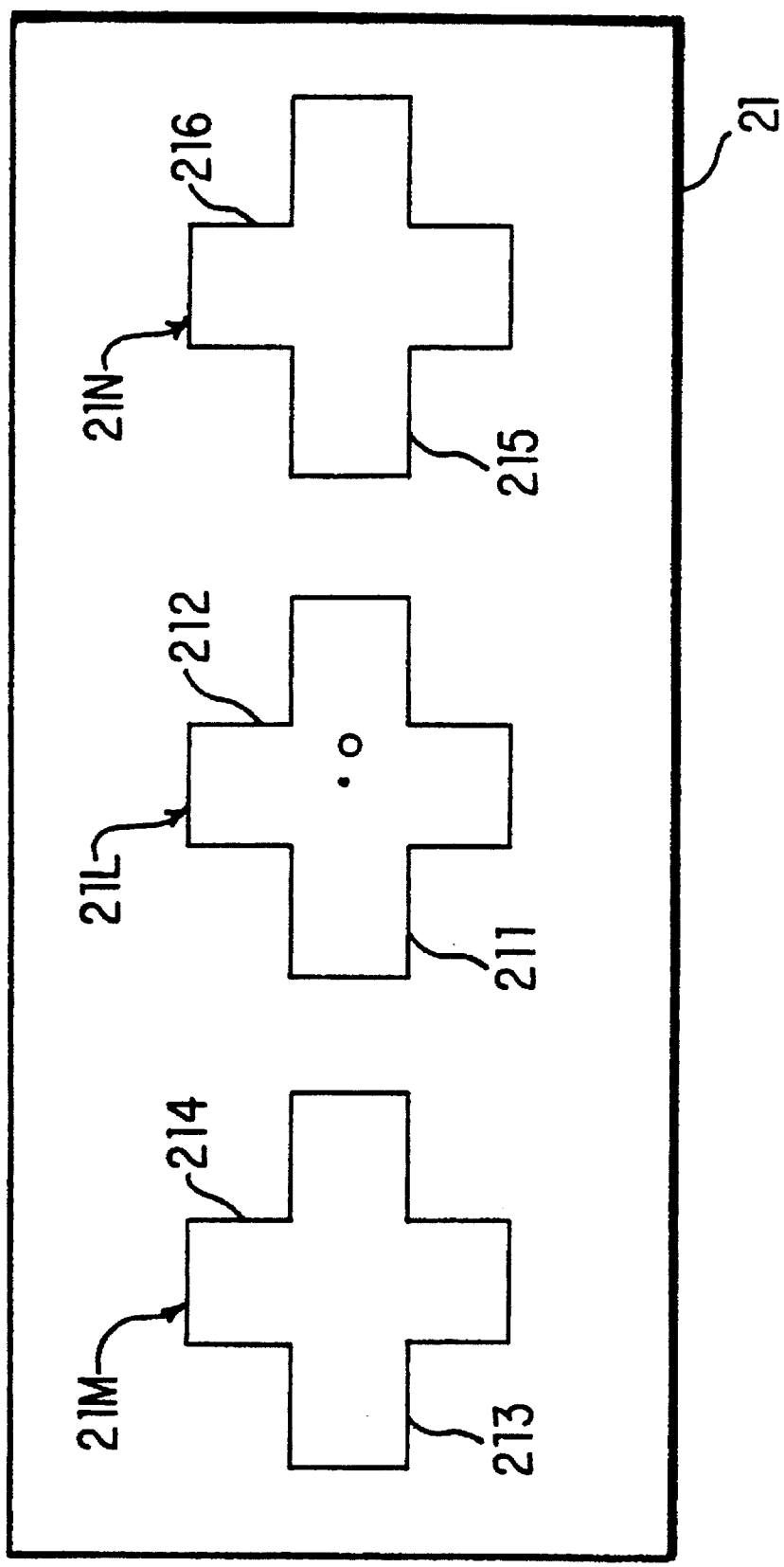
FIG. 2 is an explanatory drawing showing the opening configuration of the field of vision mask pertaining to the first embodiment.

In FIG. 2, an enlarged view of the field of vision mask 21 of FIG. 1 is shown as viewed from the photo lens side. The field of vision mask 21 is positioned in the vicinity of the prearranged focal surface of the photo lens and restricts the region in the photographic surface on which focus detection is carried out. The field of vision mask 21 has three openings, 21L, 21M and 21N. Opening 21L is positioned on the optical axis 0 of the photo lens, and openings 21M and 21N are placed at positions outside the optical axis 0 of the photo lens. Openings 21L, 21M and 21N each have roughly rectangular vertical openings 212, 214 and 216 and horizontal openings 211, 213 and 215 superimposed in a cross shape. One rectangular shaped opening corresponds to one focus detection region. For example, openings 212 and 211 correspond to two intersecting focus detection regions. Openings 213 and 215 and 214 and 216, respectively correspond to the focus detection regions outside the optical axis.

As shown in FIG. 1, the condenser lens 31 comprises three correcting lens components 311, 312 and 313. Correcting lens component 311 of the condenser lens 31 corresponds to opening 21L of the field of vision mask 21, correcting lens component 312 corresponds to opening 21M, and correcting lens component 313 corresponds to opening 21N. The condenser lens 31 collects the light rays from the photo lens, which are limited by the field of vision mask 21. The correcting lens components 311, 312 and 313 of the condenser lens are focussed on the focus detection regions, thereby providing a reverse projection of the opening in the diagram mask 41 (discussed below).

Figure 3:
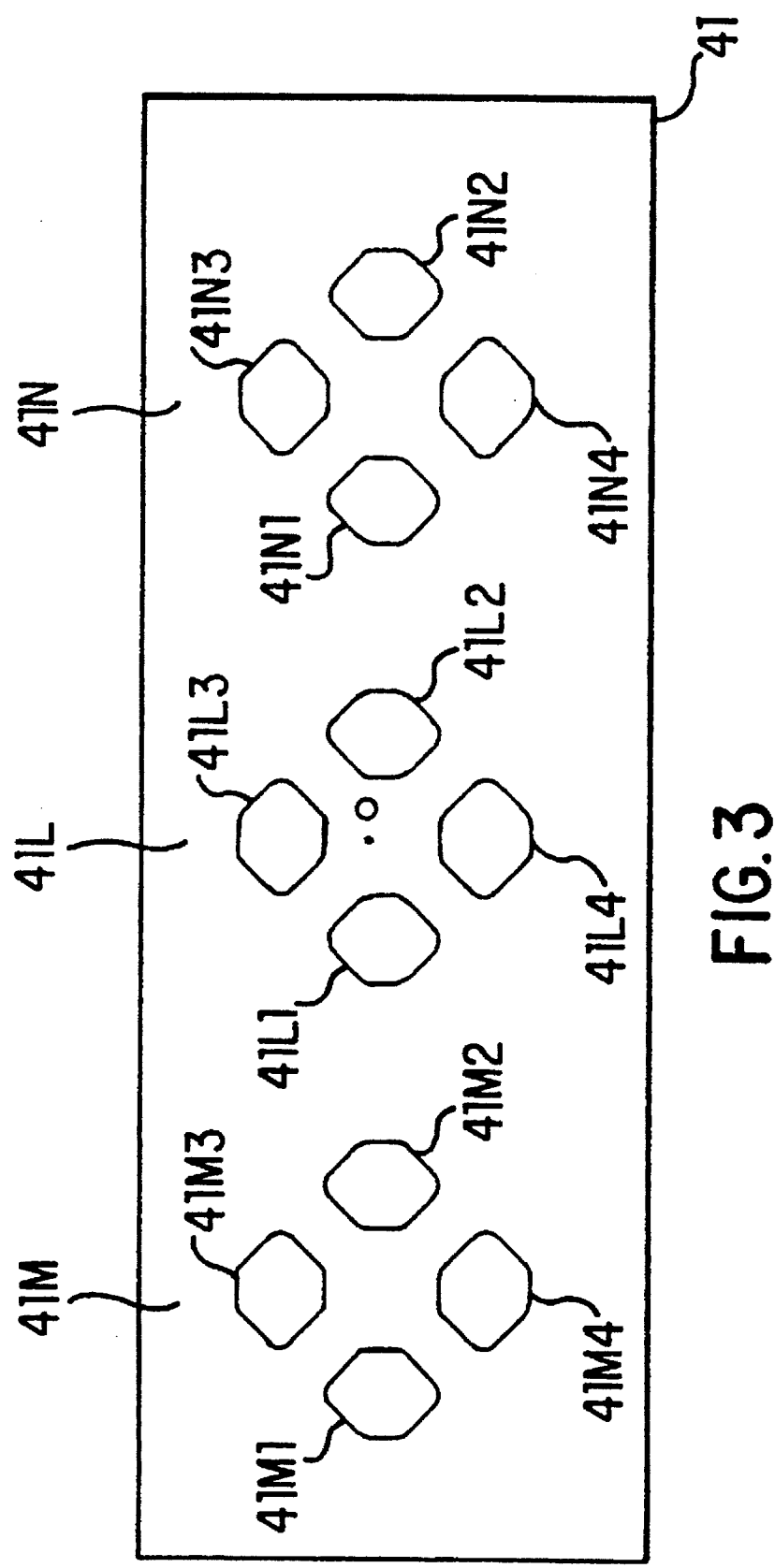
FIG. 3 is an explanatory drawing showing the opening configuration of the diaphragm mask formed as a single unit pertaining to the first embodiment.

As shown in the enlarged view of FIG. 3, as viewed from the photo lens side, the diaphragm mask 41 comprises 12 openings: light ray restricting openings 41L1, 41L2, 41L3 and 41L4 (the central component 41L), which correspond to the correcting lens component 311 of the condenser lens 31, light ray restricting openings 41M1, 41M2, 41M3 and 41M4 (side component 41M), which correspond to the correcting lens component 312, and light ray restricting openings 41N1, 41N2, 41N3 and 41N4 (side component 41N), which correspond to the correcting lens component 313. The light rays from correcting lens component 311 of the condenser lens 31 on the optical axis 0 of the photo lens are divided into the two intersecting directions represented by the pair of openings 41L1 and 41L2 of the diaphragm mask and by the pair of openings 41L3 and 41L4. In the same manner, the light rays from correcting lens component 312 of the condenser lens 31 outside the optical axis 0 of the photo lens are divided into the two intersecting directions represented by the pair of openings 41M1 and 41M2 and by the pair of openings 41M3 and 41M4, and the light rays from correcting lens component 313 of the condenser lens 31 outside the optical axis 0 of the photo lens are divided into the two intersecting directions represented by the pair of openings 41N1 and 41N2 and by the pair of openings 41N3 and 41N4.

Figure 4:
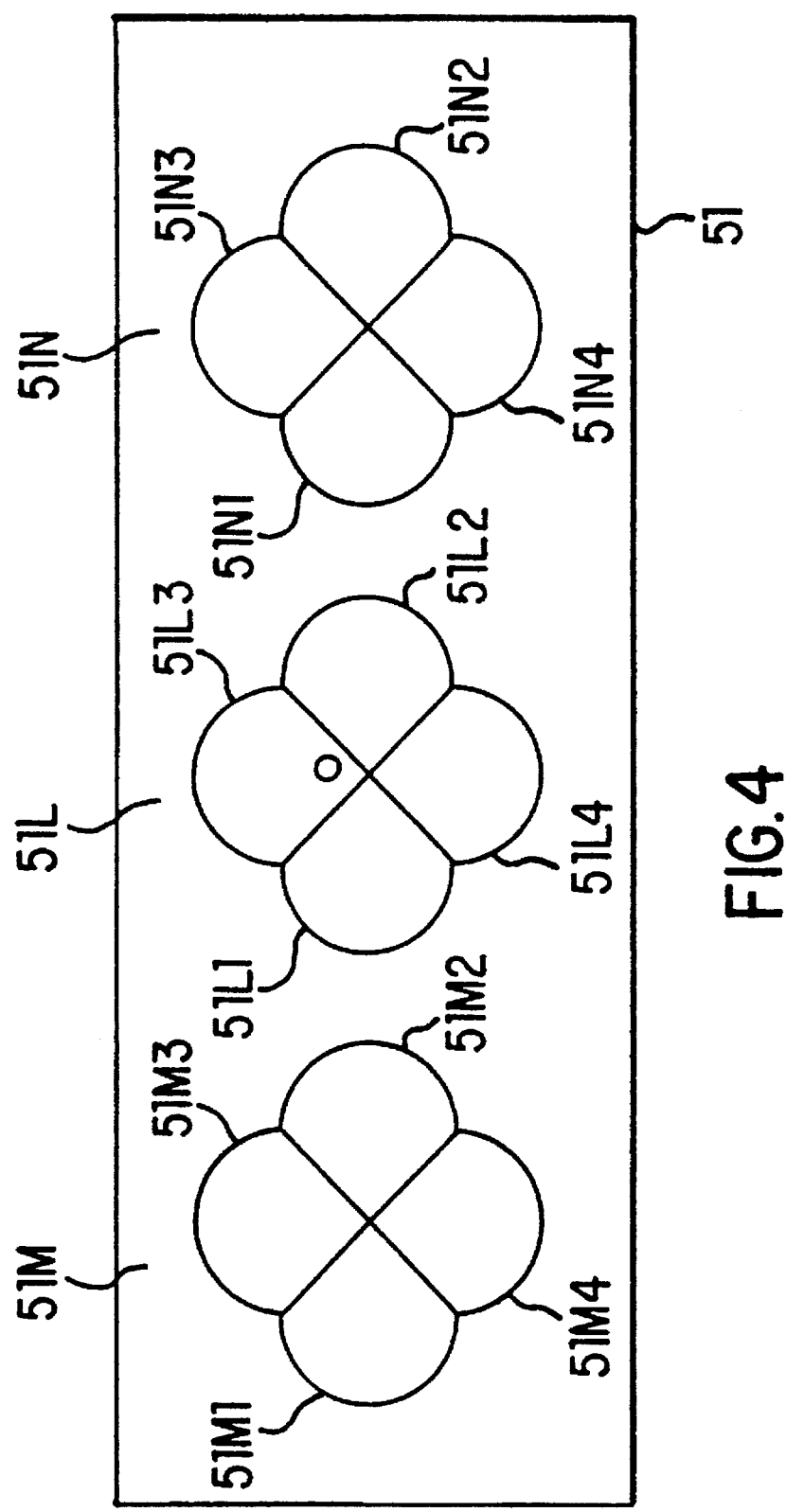
FIG. 4 is an explanatory drawing showing the configuration of the image recomposing lenses formed as a single unit pertaining to the first embodiment.

As shown in the enlarged view of FIG. 4, as viewed from the photo lens side, the image recomposing lens 51 comprises correcting lens components 51L1, 51L2, 51L3 and 51L4 (central component 51L), which correspond to openings 41L1, 41L2, 41L3 and 41L4 of the diaphragm mask 41, correcting lens components 51M1, 51M2, 51M3 and 51M4 (side component 51M), which correspond to openings 41M1, 41M2, 41M3 and 41M4 of the diaphragm mask 41, and correcting lens components 51N1, 51N2, 51N3 and 51N4 (side component 51N), which correspond to openings 41N1, 41N2, 41N3 and 41N4 of the diaphragm mask 41.

Figure 5:
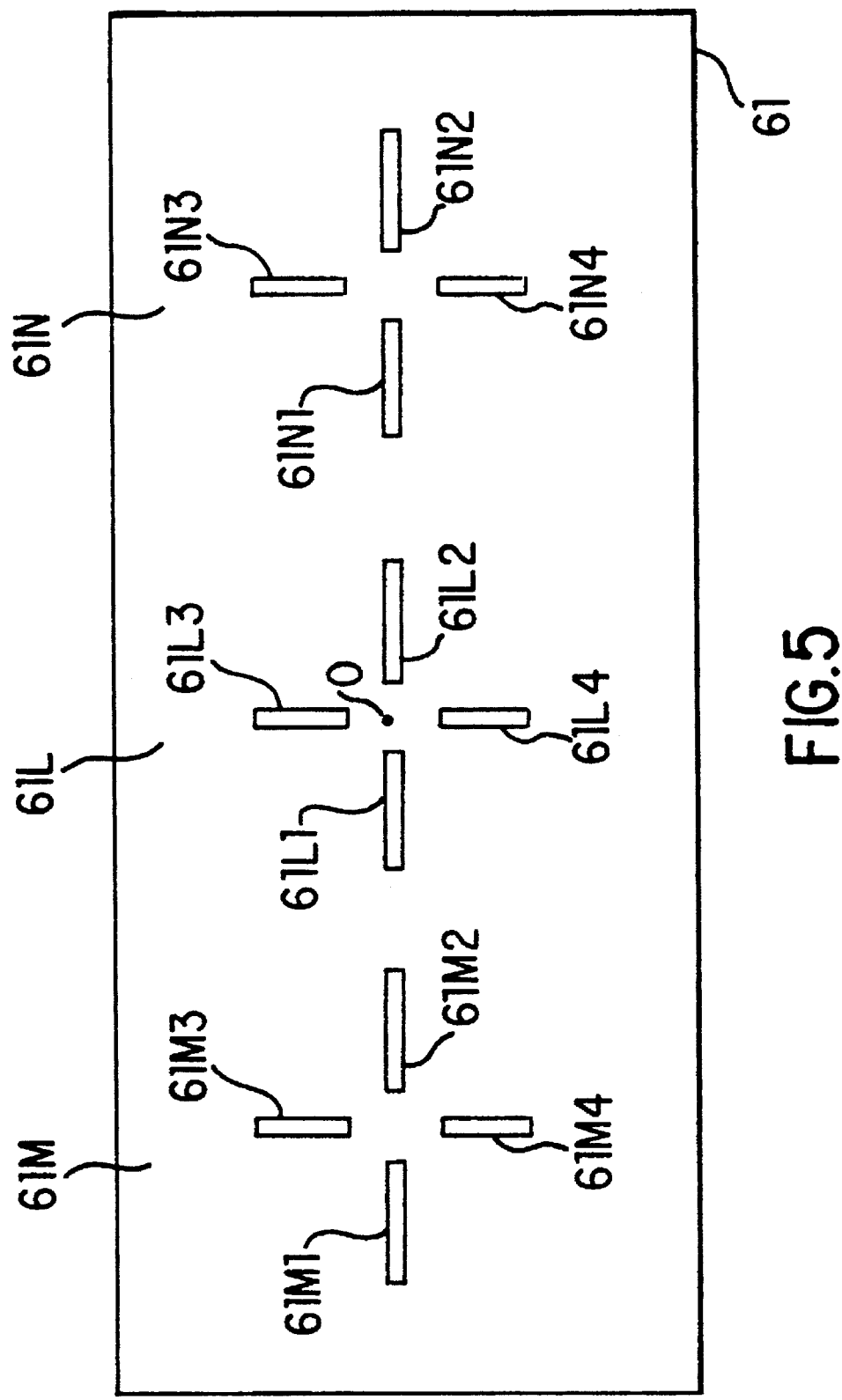
FIG. 5 is an explanatory drawing showing the configuration of the photoelectric transforming element columns formed as a single unit pertaining to the first embodiment.

As shown in the enlarged view of FIG. 5, as viewed from the photo lens side, the photoelectric transforming element 61 comprises element columns 61L1, 61L2, 61L3 and 61L4 (central component 61L), element columns 61M1, 61M2, 61M3 and 61M4 (side component 61M), and element columns 61N1, 61N2, 61N3 and 61N4 (side component 61N) of the photoelectric transforming elements 61. Light rays that pass openings 41L, 41M and 41N of the diaphragm mask 41 are conducted to the corresponding element columns of the photoelectric transforming element 61 through the correcting lens components 51L, 51M and 51N of the image recomposing lens 51.

A characteristic of the first embodiment is that the reverse projection image of the diaphragm mask via the condenser lens of the focus detecting optical system that corresponds to the focus detection region outside the optical axis of the photo lens (not shown) crosses the optical axis and forms an image of the diaphragm opening at a position separated from the optical axis on the opposite side from the focus detection region in question, with the optical axis in between. Thus, the optical axes of the correcting lens components 312 and 313 positioned on both outer sides of the condenser lens 31 are made to be eccentric so that the reverse projection image faces inward.

With the present embodiment, the conjugate points 11L, 11M and 11N of each set of diaphragm openings 41L, 41M and 41N through the condenser lens are at positions that are approximately the same relative to the direction of the optical axis 0 of the photo lens.

Figure 7:
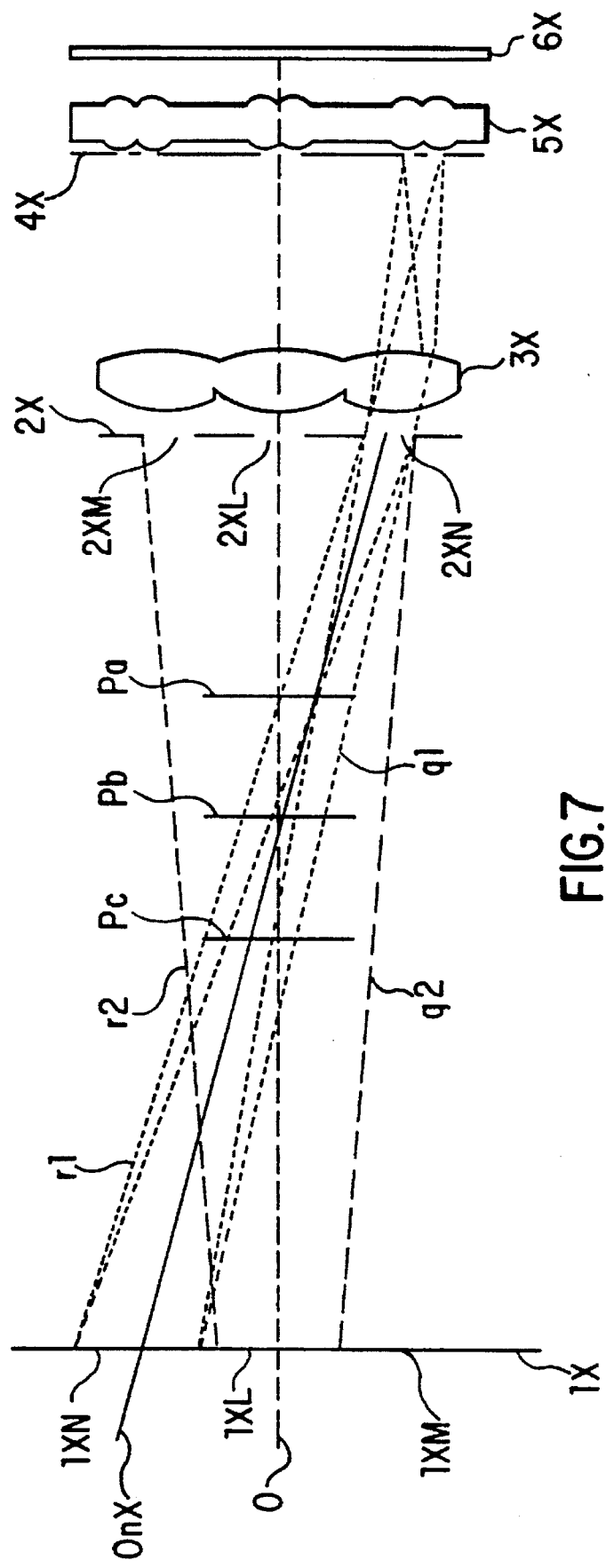
FIG. 7 is an explanatory drawing showing the difference in vignetting states between the present invention and a conventional device.
Figure 8A:
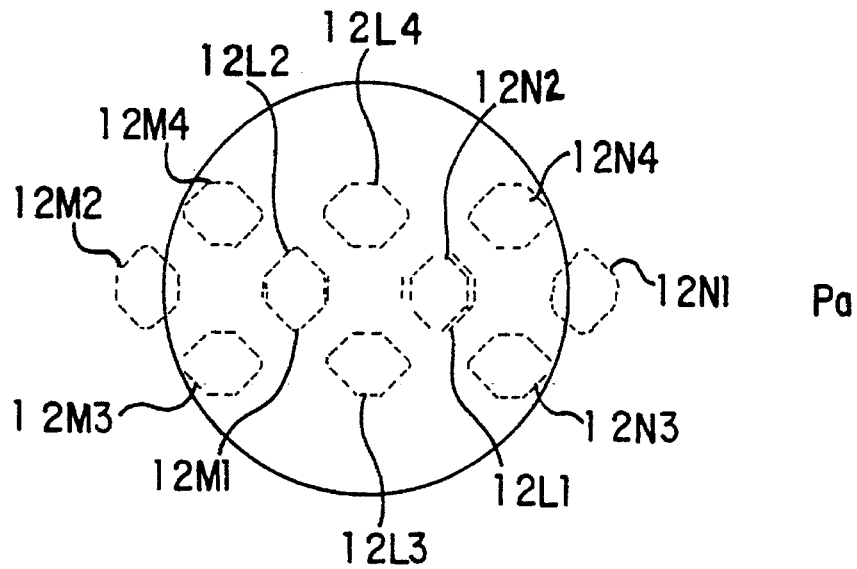
FIGS. 8 (A)–(C) are explanatory drawings showing the vignetting of focus detection light rays that occurs at the actual exit pupils Pa, Pb, and Pc on a conventional device.
Figure 8B:
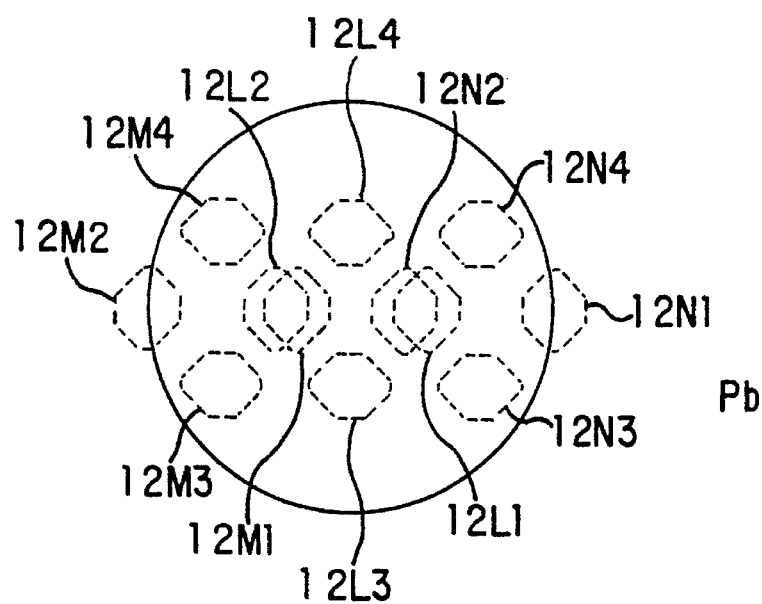
Figure 8C:
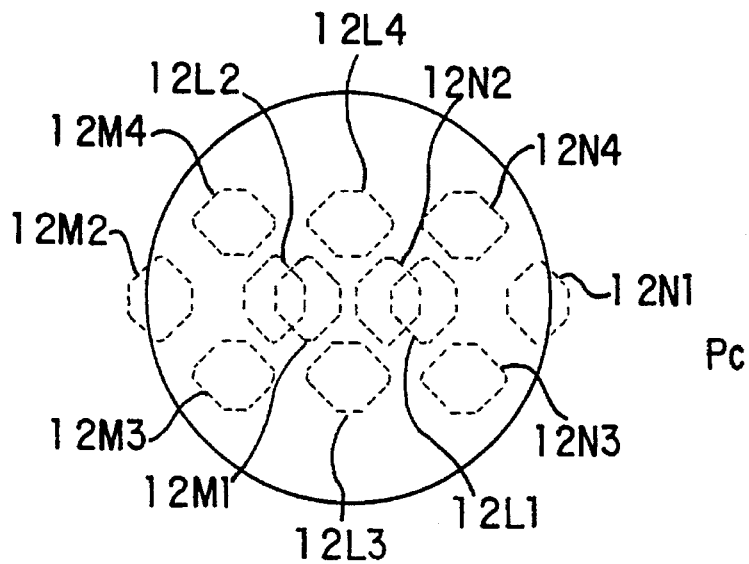

Referring again to FIG. 7, the outermost focus detecting optical line of the present embodiment corresponds to q1 on the drawing and is farther inside than the outermost focus detecting optical line q2 on a conventional device, falling inside the actual exit pupils Pa, Pb and Pc. Even for the optical line r1 at which the inward facing angle is at the maximum size, vignetting is avoided because r1 is farther inside over the range from Pa-Pc than optical line r2 on a conventional device and is inside the exit pupils Pa, Pb and Pc.

Figure 9A:
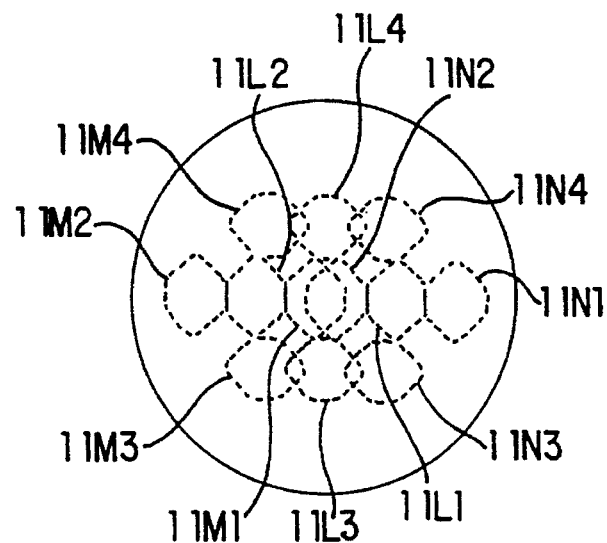
FIGS. 9 (A)–(C) are explanatory drawings showing the vignetting of focus detection light rays that occurs at the actual exit pupils Pa, Pb, and Pc on the present invention.
Figure 9B:
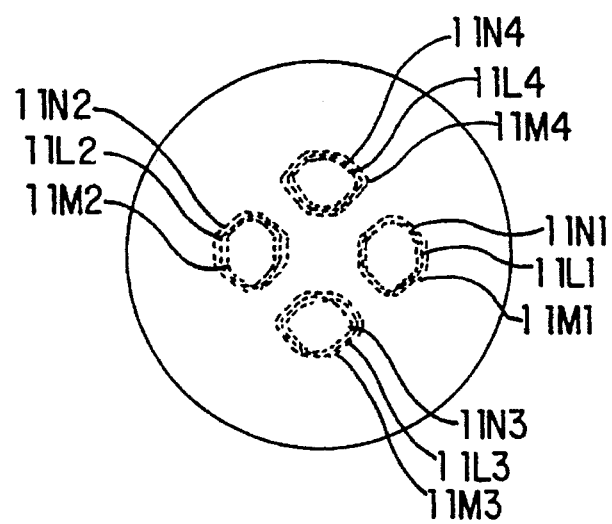
Figure 9C:
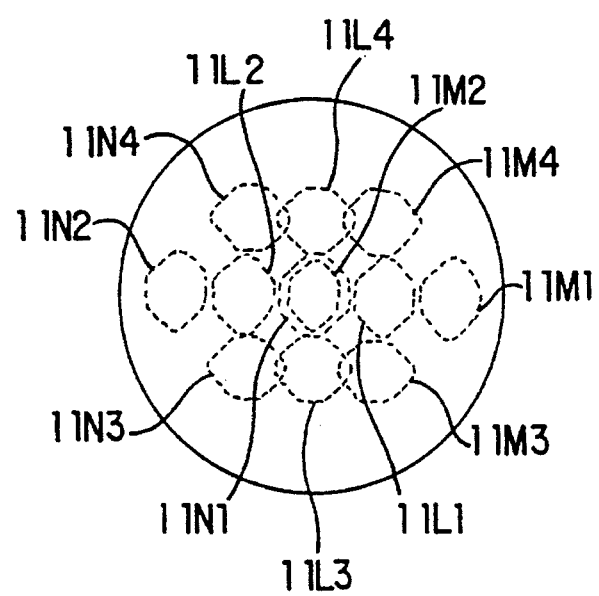

The relationship between the light rays corresponding to the focus detection regions outside the optical axis in the present invention and the actual exit pupils Pa, Pb, and Pc of the photo lens is shown in FIGS. 9 (A), (B), and (C). It can be seen that in each position, the light rays pass through inside the exit pupils and vignetting is avoided.

Through the construction of the present embodiment, vignetting can be avoided even on focus detecting optical systems that have focus detection regions positioned in the diametrical direction outside the photographic surface optical axis. Thus, cross-shaped focus detection regions with intersecting horizontal and vertical regions can be used even in positions separated from the optical axis of the photographic surface.

The second embodiment of the present invention will be described with reference to FIG. 10.

With the second embodiment, the diaphragm masks 43L, 43M and 43N, the image recomposing lenses 53L, 53M and 53N, and the photoelectric transforming element columns 63L, 63M and 63N of a focus detecting optical system with intersecting horizontal and vertical focus detection regions on and outside the optical axis of the photographic surface are each constructed separately. The conjugate points 13L, 13M and 13N of each set of two diaphragm openings 43L, 43M and 43N through the condenser lens 33 are in roughly the same positions relative to the optical axis 0 of the photo lens. In addition, the correcting lens portions 332 and 333 positioned on both outer sides of the condenser lens 33 are inclined toward the optical axis in order to make the reverse projection image of the diaphragm opening face inward. In other respects, the construction is the same as that of the first embodiment.

Figure 10:
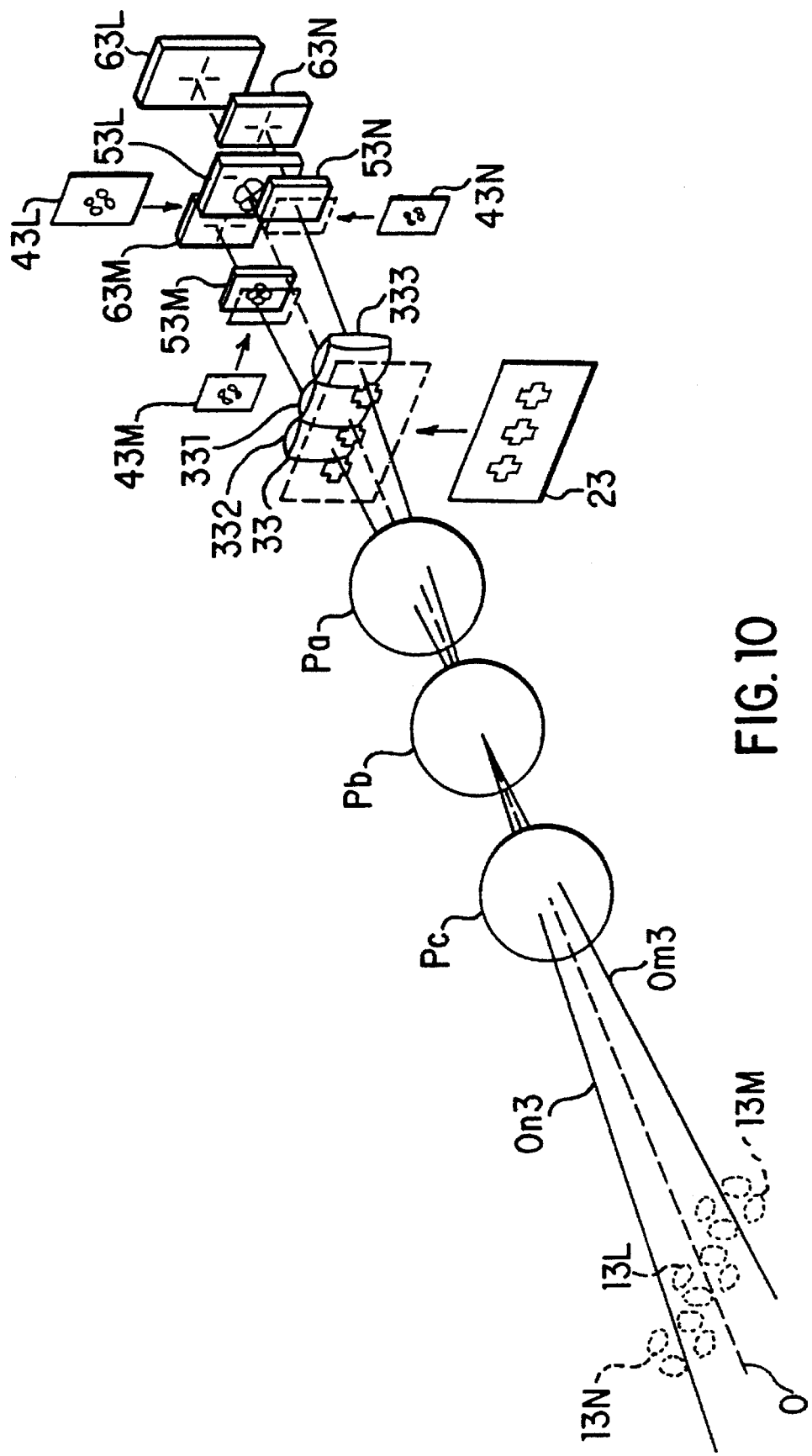
FIG. 10 is an explanatory drawing showing a second embodiment of the present invention.

As shown in FIG. 10, with the present embodiment, the construction is such that the total length of a focus detecting optical system outside the optical axis of the photographic surface (in other words, the distance from the field of vision mask 23 or from the condenser lens 33 to the photoelectric transforming element 63) is shorter than the corresponding distance on the focus detecting optical system that lies on the optical axis. Thus, the usage magnification of the condenser lens, which forms the conjugate relationship between the exit pupil and the diaphragm mask, is changed, and the distance between the condenser lens and the diaphragm is changed for each focus detecting optical system. Through this construction, the physical structure of the focus detecting optical systems is made to conform to the available space within the camera body, and ultimately an increase in the size of the camera due to the entire focus detection device can be avoided.

In addition to the above, the construction should be such that the size of the diaphragm openings of the diaphragm mask are made to be different for each focus detecting optical system that has a different total length, and the size of the reverse projection image of the diaphragm opening at an arbitrary position on the optical axis of the photo lens is approximately equal. In other words, the diaphragm opening of the central diaphragm mask 43L is made to be larger than the diaphragm openings of the diaphragm masks 43M and 43N on both sides of the optical axis. Through this construction, the amount of light of the focus detection light rays that reaches the photographic surface for each focus detecting optical system is roughly uniform, and the power that pertains to focus detection at a low degree of brightness for each focus detecting optical system can be equally maintained.

Figure 11:
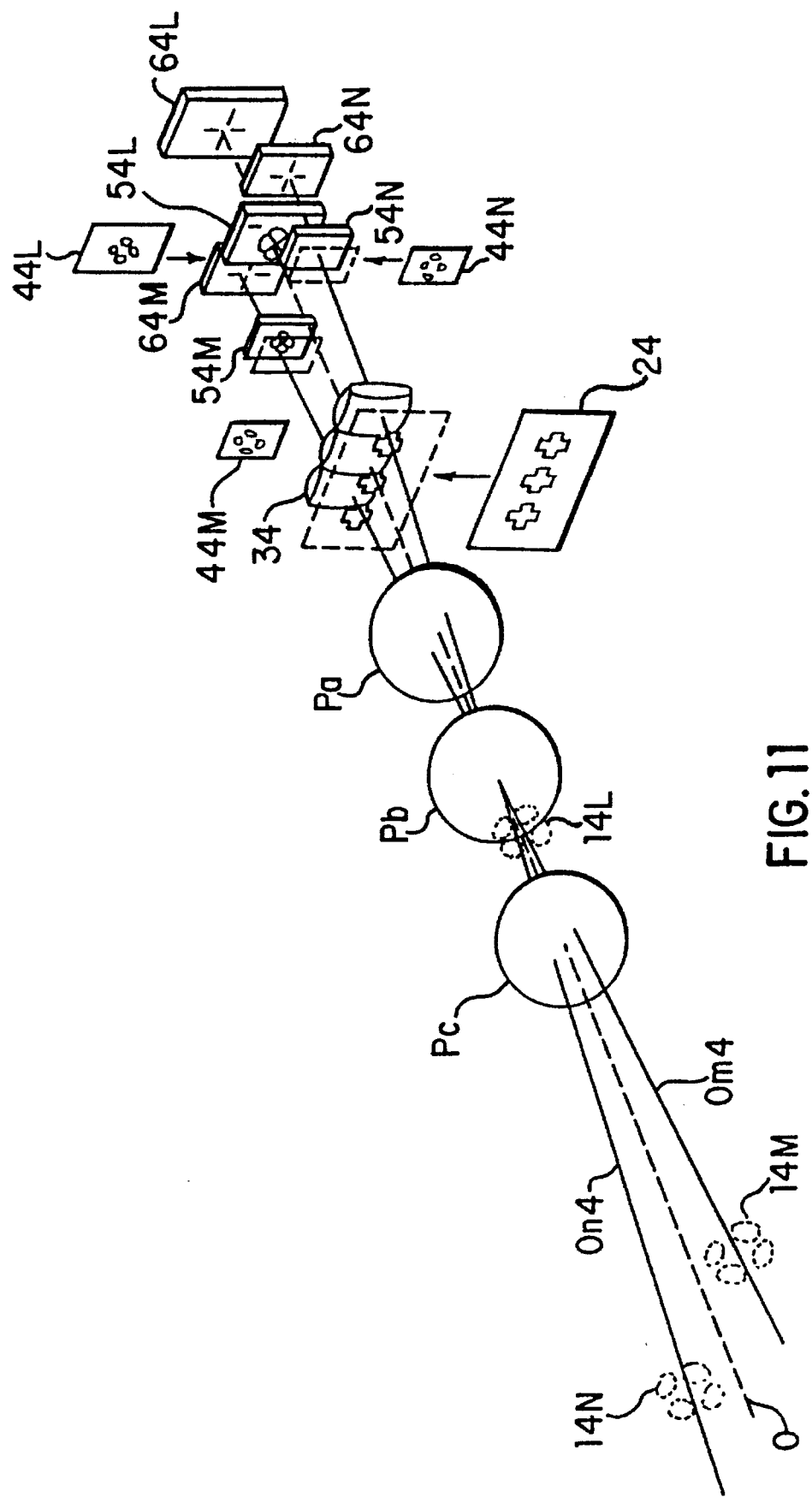
FIG. 11 is an explanatory drawing showing a third embodiment of the present invention.

The third embodiment of the present invention will be described with reference to FIG. 11.

With the third embodiment, as with the second embodiment, the diaphragm masks 44L, 44M and 44N, the image recomposing lenses 54L, 54M and 54N, and the photoelectric transforming element columns 64L, 64M and 64N of a focus detecting optical system with intersecting horizontal and vertical focus detection regions on and outside the optical axis of the photographic surface are each constructed separately. However, unlike the second embodiment, the conjugate points 14M and 14N of the sets of two diaphragm openings 44M and 44N through the condenser lens 33 are in positions farther along the optical axis 0 of the photo lens as compared to the conjugate point 14L of the set of two diaphragm openings 44L of the focus detecting optical system with the focus detection region on the optical axis. This construction is possible by setting the magnification of the condenser lens. In this embodiment, too, the diaphragm opening of the central diaphragm mask 44L is larger than the diaphragm openings of the diaphragm masks 44M and 44N on both sides of the optical axis.

Figure 13A:
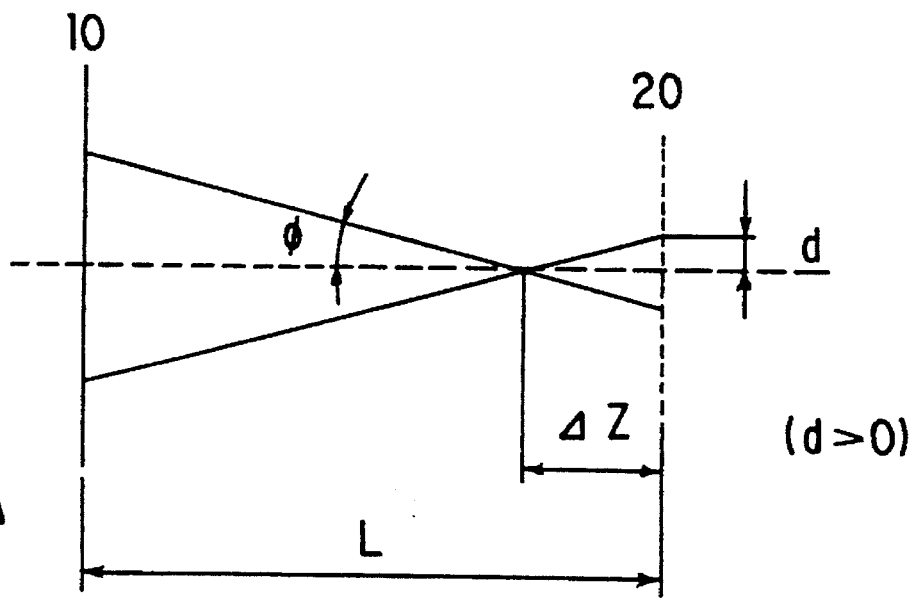
FIGS. 13 (A) and (B) are explanatory drawings showing the defocus detection ranges on the infinite distance side and the near-distance side.
Figure 13B:
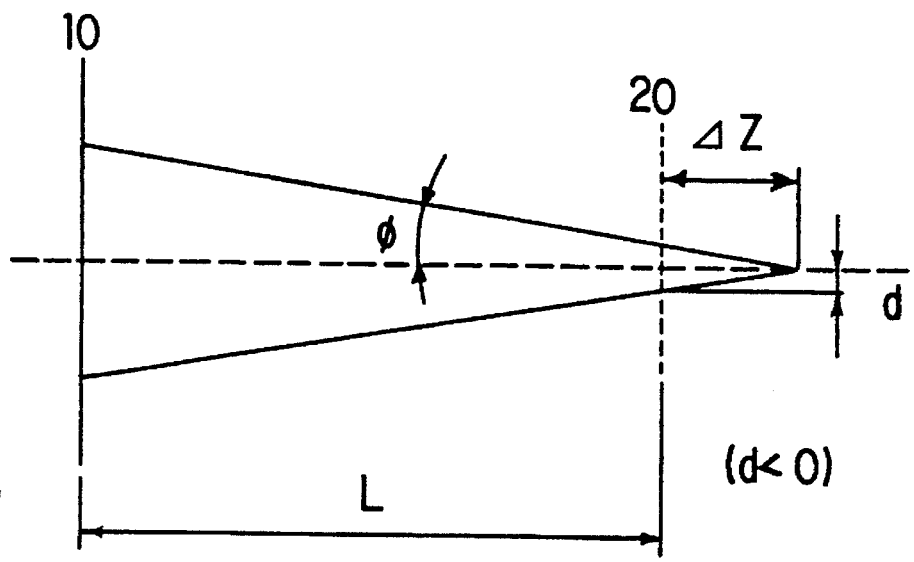
Figure 14:
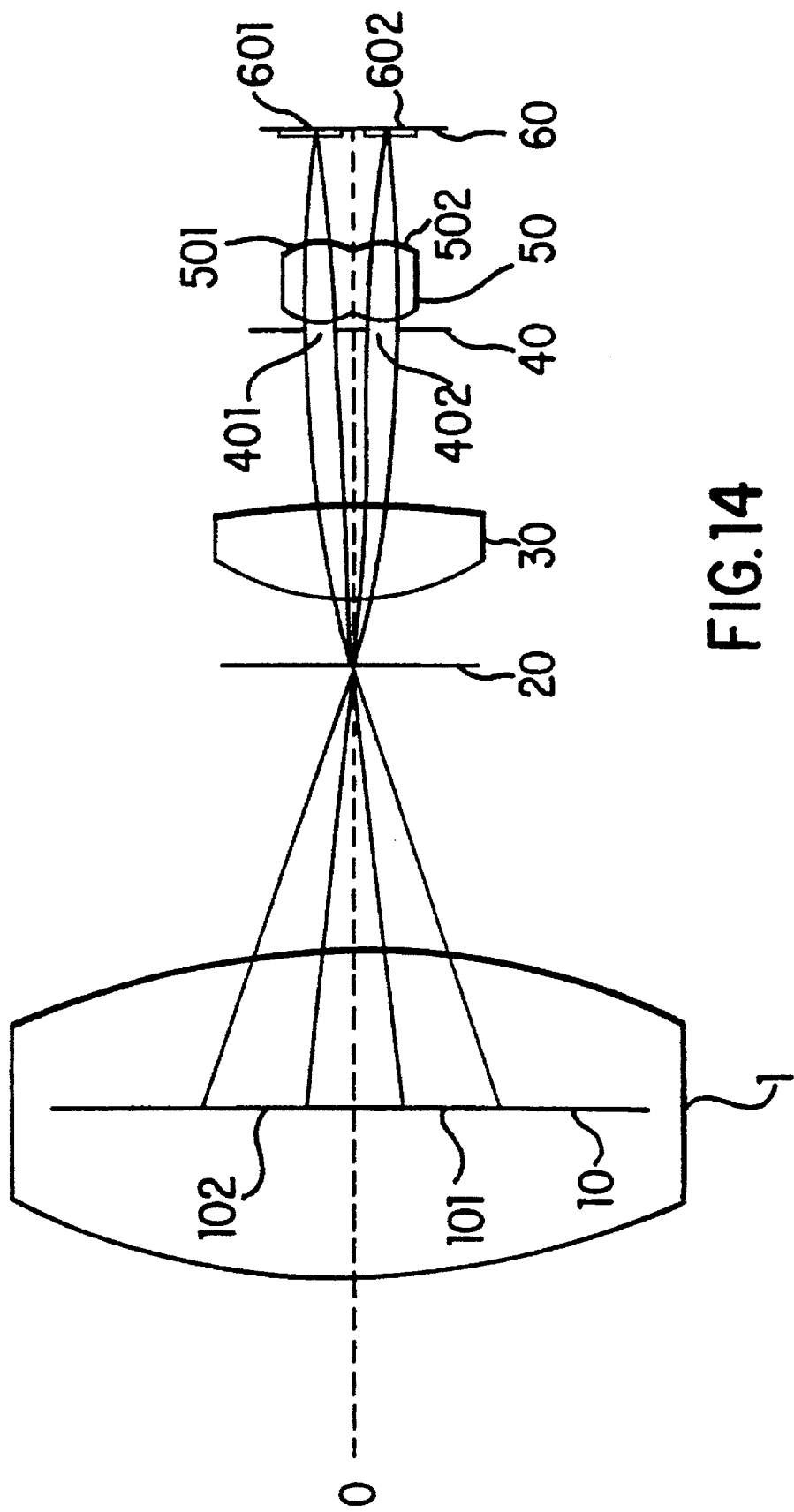
FIG. 14 is an explanatory drawing showing the focus detection theory.

When focus detection regions are positioned outside the optical axis of the photographic surface, it is difficult to maintain a long focus detection region because the reliability of focus detection is reduced through restrictions of asymmetrical aberrations of the photo lens outside the optical axis. The length d of the appropriate side of a prearranged focal surface of the photo lens of the range that detects the relative position of the second image in FIG. 13 cannot be maintained, and the defocus detection range is narrowed. In this state, the same near-distance defocus detection range can be maintained by making the distance L between the exit pupil and the photo lens in a focus detecting optical system outside the optical axis longer than the corresponding distance on a focus detecting optical system that is on the optical axis.

Figure 12:
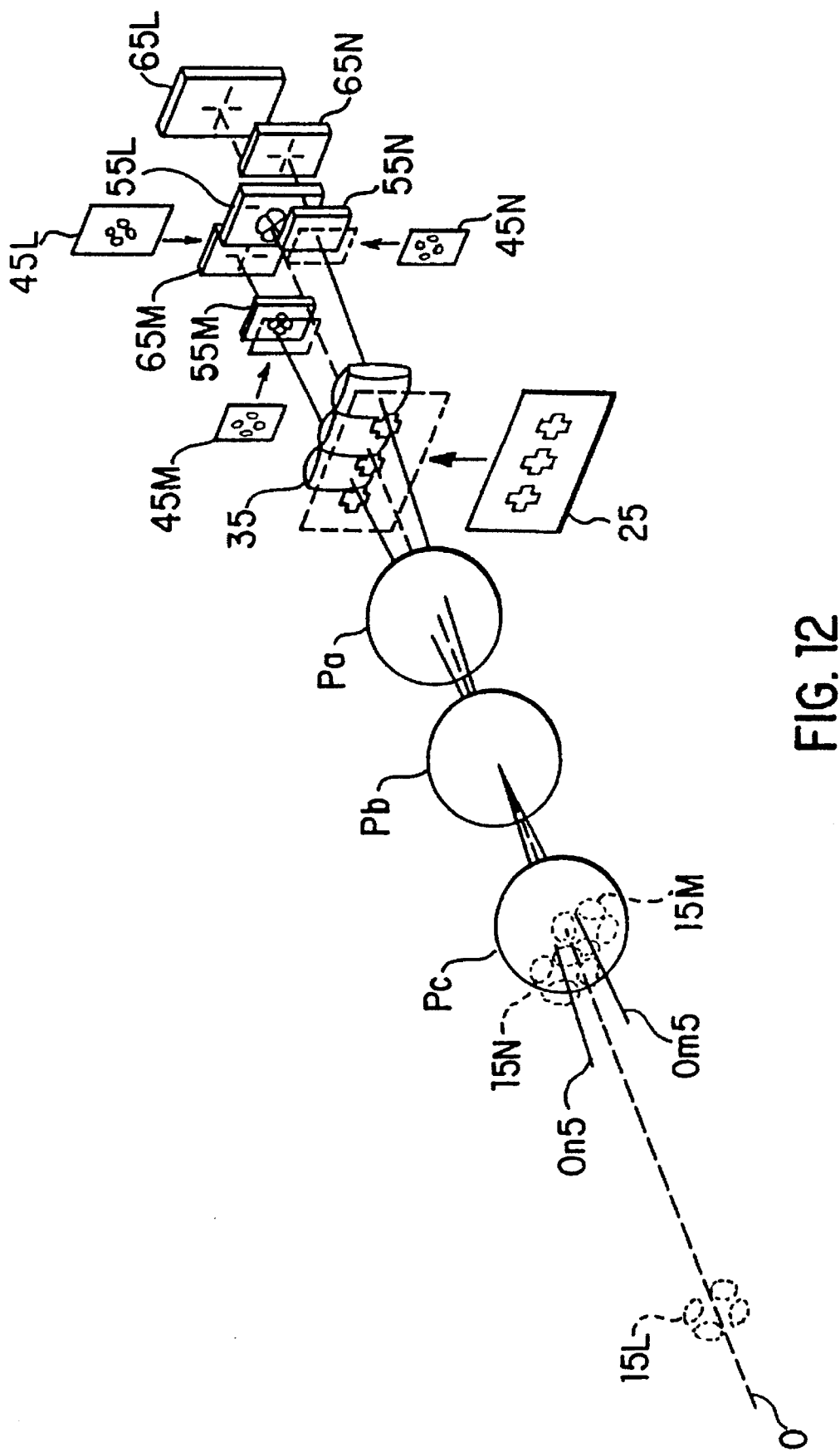
FIG. 12 is an explanatory drawing showing a fourth embodiment of the present invention.

The fourth embodiment of the present invention will be described with reference to FIG. 12.

With the fourth embodiment, also, the diaphragm masks 45L, 45M and 45N, the image recomposing lenses 55L, 55M and 55N, and the photoelectric transforming element columns 65L, 65M and 65N of a focus detecting optical system with intersecting horizontal and vertical focus detection regions on and outside the optical axis of the photographic surface are each constructed separately. However, the conjugate point 15L of the set of two diaphragm openings 45L of the focus detecting optical system with a focus detection region on the optical axis of the photographic surface through the condenser lens is at a point farther along the optical axis 0 of the photo lens as compared to the conjugate points 15M and 15N of the sets of two diaphragm openings 45M and 45N of the focus detecting optical systems with focus detection regions outside the optical axis through the condenser lens. In all other respects, this embodiment is the same as the third embodiment.

On the focus detecting optical system with a focus detection region on the optical axis of the photographic surface, photography at asymmetrical aberrations outside the optical axis of the photo lens is insignificant, and because the reliability of the focus detection is higher than on a focus detecting optical system outside the optical axis, the distance between the exit pupil of the focus detecting optical system on the optical axis and the prearranged focal surface of the photo lens can be made longer, making possible a wider-range close-distance defocus detection.

The distance between the condenser lens and the diaphragm of the focus detecting optical systems is the same, but it is conceivable that the construction could be such that the position of the reverse projection image of the diaphragm mask is different for each focus detecting optical system. In this case, too, the usage magnification of the condenser lens that forms the conjugate relationships may be made different for each focus detecting optical system. On this type of focus detection device as well, the power that pertains to focus detection at a low degree of brightness for each focus detecting optical system can be maintained with approximate equality in the same manner by making the construction such that the size of the diaphragm opening is different for each focus detecting optical system on which the position of the exit pupil relative to the direction along the optical axis 0 of the photo lens is different and that the sizes of the reverse projection images of the diaphragm openings at an arbitrary position on the optical axis of the photo lens are approximately equal.

Furthermore, in addition to the construction described above in which the usage magnification of the condenser lens is different for each focus detecting optical system, through making the construction such that the reverse projections through the condenser lens of the diaphragm openings opposite the focus detecting optical systems with focus detection regions outside the optical axis of the photographic surface face toward the optical axis of the photo lens, or such that the reverse projection of the diaphragm crosses the optical axis of the photo lens, the same focus detection accuracy and near-distance defocus detection range of the focus detecting optical systems both on and outside the optical axis of the photographic surface can be obtained, and vignetting can be even further avoided.

According to the invention described above, with a focus detection device equipped with focus detecting systems with focus detection regions both on and outside the optical axis of the photographic surface, the construction enables the reverse projections through the condenser lens of the diaphragm openings opposite the focus detecting optical systems with focus detection regions outside the optical axis of the photographic surface to face toward the optical axis of the photo lens and cross the optical axis. Thus, the focus detection accuracy and the near-distance focus detection range can be adequately maintained, vignetting of the focus detection light rays through incompatibilities with the exit pupil of the installed photo lens can be suppressed, and a stable focus detection accuracy can be maintained.

While the embodiments herein are preferred, it would be appreciated from this specification that various alternatives, modifications, variations or improvements therein may be made by those skilled in the art that are within the scope of the invention, which is defined by the following claims.

What is claimed is:

1. A focus state detecting device for detecting a focus state of an image, said focus state detecting device comprising:
   an objective lens having an optical axis and an exit pupil;
   a first focus state detecting optical system positioned on the optical axis of said objective lens, said first system comprising:
      a first condenser lens positioned behind a predetermined image plane of said objective lens,
      a first diaphragm mask positioned behind said first condenser lens, said first diaphragm mask having a pair of openings to divide the exit pupil of the objective lens into two regions,
      a first re-imaging optical device causing the image from the objective lens to be reformed into a pair of images using the light fluxes that pass through the pair of openings of said first diaphragm mask, and
      a first photoelectric sensor array that receives the pair of images formed by said first re-imaging optical device; and
   a second focus state detecting optical system positioned beside the optical axis of said objective lens, said second system comprising:
      a second condenser lens positioned behind the predetermined image plane of said objective lens,
      a second diaphragm mask positioned behind said second condenser lens, said second diaphragm mask having a pair of openings to divide the exit pupil of the objective lens into two regions,
      a second re-imaging optical device causing the image from the objective lens to be reformed into a pair of images using the light fluxes that pass through the pair of openings of said second diaphragm mask, and
      a second photoelectric sensor array that receives the pair of images formed by said second re-imaging optical device,
   wherein a first conjugate image of the pair of openings of the first diaphragm mask is composed by said first condenser lens, and a second conjugate image of the pair of openings of the second diaphragm mask is composed by said second condenser lens, the first conjugate image being positioned on the optical axis of said objective lens, and the second conjugate image being positioned beside the optical axis of said objective lens on the side opposite said second focus state detecting optical system.

2. The focus state detecting device of claim 1, wherein a condenser optical axis of the second condenser lens in the second focus state detecting optical system is eccentric.

3. The focus state detecting device of claim 1, wherein a condenser optical axis of the second condenser lens in the second focus state detecting optical system is inclined.

4. The focus state detecting device of claim 1, wherein a focus state detecting area of the second focus state detecting optical system is positioned along a radial direction of the optical axis of said objective lens and to the side of the optical axis of said objective lens.

5. The focus state detecting device of claim 4, further comprising a third focus state detecting optical system, wherein a focus state detecting area of said third focus state detecting optical system is disposed beside the optical axis of said objective lens and is positioned along a circumferential direction of the optical axis of said objective lens substantially perpendicular to the focus state detecting area of said second focus state detecting optical system.

6. The focus state detecting device of claim 5, wherein the third focus state detecting optical system comprises:

a third condenser lens positioned behind the predetermined image plane of said objective lens;

a third diaphragm mask positioned behind said third condenser lens, and said third diaphragm mask having a pair of openings to divide the exit pupil of the objective lens into two regions;

a third re-imaging optical device causing the image from the objective lens to be reformed into a pair of images using the light fluxes that pass through the pair of openings of said third diaphragm mask; and a third photoelectric sensor array that receives the pair of images formed by said third re-imaging optical device, wherein a third conjugate image of the pair of openings of the third diaphragm mask is composed by said third condenser lens, said third conjugate image being positioned beside the optical axis of said objective lens on the side opposite said third focus state detecting optical system so as to sandwich the optical axis of said objective lens.

7. The focus state detecting device of claim 1, wherein a first distance from the first condenser lens of said first focus state detecting optical system to the first photoelectric sensor array is different from a second distance from the second condenser lens of the second focus state detecting optical system to the second photoelectric sensor array.

8. The focus state detecting device of claim 7, wherein the size of the openings of said first diaphragm mask is different from the size of the openings of said second diaphragm mask.

9. The focus state detecting device of claim 8, wherein the size of said first conjugate image corresponding to said first focus state detecting optical system is substantially equivalent to the size of said second conjugate image corresponding to said second focus state detecting optical system.

10. The focus state detecting device of claim 1, wherein the first and second conjugate images have substantially the same position with respect to a direction along the optical axis of said objective lens.

11. The focus state detecting device of claim 1, wherein the first and second conjugate images have different positions with respect to a direction along the optical axis of said objective lens.

12. The focus state detecting device of claim 7, wherein the first and second conjugate images have different positions with respect to a direction along the optical axis of said objective lens.

13. The focus state detecting device of claim 8, wherein the first and second conjugate images have different positions with respect to a direction along the optical axis of said objective lens.

14. The focus state detecting device of claim 6, wherein a first distance is defined from the first condenser lens of said first focus state detecting optical system to the first photoelectric sensor array, a second distance is defined from the second condenser lens of the second focus state detecting optical system to the second photoelectric sensor array, and a third distance is defined from the third condenser lens of the third focus state detecting optical system to the third photoelectric sensor array, the second and third distances being different from the first distance.

15. The focus state detecting device of claim 1, comprising six focus state detecting optical systems corresponding to six focus state detecting areas, wherein said six focus state detecting areas comprise a first pair of focus state detecting areas positioned in a cross shape on the optical axis of said objective lens, a second pair of focus state detecting areas positioned in a cross shape beside the optical axis of said objective lens, and a third pair of focus state detecting areas positioned in a cross shape beside the optical axis of said objective lens opposite said second pair of focus state detecting areas.

16. The focus state detecting device of claim 1, wherein said first condenser lens corresponding to said focus state detecting optical system is separate from said second condenser lens corresponding to said second focus state detecting optical system.

17. The focus state detecting device of claim 6, wherein said second and third condenser lenses are together and are separate from said first condenser lens.

18. The focus state detecting device of claim 1, wherein structural portions of said first focus state detecting optical system are separate from structural portions of said second focus state detecting optical system.

19. The focus state detecting device of claim 6, wherein second and third structural portions of said second and third focus state detecting optical systems, respectively are integrally formed as one unit and are separate from first structural portions of said first focus state detecting optical system.

20. The focus state detecting device of claim 6, wherein a size of the second and third openings of said second and third diaphragm masks, respectively, is different from the size of the first openings of said first diaphragm mask.

21. The focus state detecting device of claim 20, wherein a size of the second and third conjugate images is substantially equivalent to the size of the first conjugate image.

22. The focus state detecting device of claim 6, wherein the second and third conjugate images and the first conjugate image have substantially same position with respect to a direction along the optical axis of said objective lens.

23. The focus state detecting device of claim 6, wherein the second and third conjugate images and the first conjugate image have different positions with respect to a direction along the optical axis of said objective lens.

24. The focus state detecting device of claim 1, further comprising a field mask, wherein said field mask has openings corresponding to the first and second focus state detecting areas, said field mask being positioned in front of the first and second condenser lenses near the predetermined image plane of said objective lens.

25. The focus state detecting device of claim 5, further comprising a field mask, wherein said field mask has openings corresponding to the first, second and third focus state detecting areas, said field mask being positioned in front of the first, second and third condenser lenses near the predetermined image plane of said objective lens.

26. A focus state detecting device for detecting a focus state of a image, said focus state detecting device comprising:

an objective lens having an optical axis and an exit pupil;

a first focus state detecting optical system positioned on the optical axis of said objective lens, said first system comprising:
- a first condenser lens positioned behind a predetermined image plane of said objective lens,
- a first diaphragm mask positioned behind said first condenser lens, said first diaphragm mask having a pair of openings to divide the exit pupil of the objective lens into two regions,
- a first re-imaging optical device causing the image from the objective lens to be reformed into a pair of images using the light fluxes that pass through the pair of openings of said first diaphragm mask, and
- a first photoelectric sensor array that receives the pair of images formed by said first re-imaging optical device;

a second focus state detecting optical system positioned beside the optical axis of said objective lens, said second system comprising:
- a second condenser lens positioned behind the predetermined image plane of said objective lens,
- a second diaphragm mask positioned behind said second condenser lens, said second diaphragm mask having a pair of openings to divide the exit pupil of the objective lens into two regions,
- a second re-imaging optical device causing the image from the objective lens to be reformed into a pair of images using the light fluxes that pass through the pair of openings of said second diaphragm mask, and
- a second photoelectric sensor array that receives the pair of images formed by said second re-imaging optical device; and a third focus state detecting optical system positioned beside the optical axis of said objective lens opposite said second focus state detecting optical system, said third system comprising:
- a third condenser lens positioned behind the predetermined image plane of said objective lens,
- a third diaphragm mask positioned behind said third condenser lens, said third diaphragm mask having a pair of openings to divide the exit pupil of the objective lens into two regions,
- a third re-imaging optical device causing the image from the objective lens to be reformed into a pair of images using the light fluxes that pass through the pair of openings of said third diaphragm mask, and
- a third photoelectric sensor array that receives the pair of images formed by said third re-imaging optical device, wherein a first conjugate image of the pair of openings of the first diaphragm mask is formed by said first condenser lens, a second conjugate image of the pair of openings of the second diaphragm mask is formed by said second condenser lens, and a third conjugate image of the pair of openings of the third diaphragm mask is formed by said third condenser lens, the first conjugate image being positioned on the optical axis of said objective lens, and the second and third conjugate images being positioned beside the optical axis of said objective lens on the side opposite their respective focus state detecting optical systems.

* * * * *